(12) United States Patent
Letourneur et al.

(10) Patent No.: US 10,052,641 B2
(45) Date of Patent: Aug. 21, 2018

(54) CENTRIFUGE EQUIPPED WITH A BALANCING MECHANISM AND METHOD OF BALANCING SUCH A CENTRIFUGE

(71) Applicant: MACOPHARMA SAS, Tourcoing (FR)

(72) Inventors: Jean-Claude Letourneur, Pornichet (FR); Philippe Le Guyader, Poligne (FR); Franck Boucard, Challans (FR)

(73) Assignee: Macopharma SAS, Tourcoing (FR)

(*) Notice: Subject to any disclaimer, the term of this patent is extended or adjusted under 35 U.S.C. 154(b) by 890 days.

(21) Appl. No.: 14/515,825

(22) Filed: Oct. 16, 2014

(65) Prior Publication Data

US 2015/0038311 A1  Feb. 5, 2015

Related U.S. Application Data

(63) Continuation of application No. PCT/EP2013/001105, filed on Apr. 15, 2013.

(51) Int. Cl.
*B04B 9/14* (2006.01)
*B04B 13/00* (2006.01)
(Continued)

(52) U.S. Cl.
CPC ............. *B04B 9/146* (2013.01); *B04B 9/10* (2013.01); *B04B 9/14* (2013.01); *B04B 13/00* (2013.01); *F16F 15/36* (2013.01)

(58) Field of Classification Search
CPC .. B04B 9/146; B04B 9/14; B04B 9/10; B04B 13/00; F16F 15/14; F16F 15/145; F16F 15/20; F16F 15/22; F16F 15/28; F16F 15/32; F16F 15/36; G01M 1/30; G11B 19/2027; H02K 7/04
(Continued)

(56) References Cited

U.S. PATENT DOCUMENTS 2,442,397 A   6/1948 Candor
5,160,876 A * 11/1992 Niinai .................... B04B 9/146
                                                  318/460
(Continued)

FOREIGN PATENT DOCUMENTS

DE   102008054089 A1    5/2009
EP       1247585 A1   10/2002
EP       2077871 A2 *  7/2009   .......... A61M 1/3693

OTHER PUBLICATIONS

PCT International Search Report for International Application No. PCT/EP2013/001105 dated Jul. 23, 2013, 11 pages.

*Primary Examiner* — Walter Dean Griffin
*Assistant Examiner* — Shuyi S Liu
(74) *Attorney, Agent, or Firm* — Baker Botts L.L.P.

(57) ABSTRACT

The disclosure relates to a centrifuge with a balancing mechanism and method of balancing such a centrifuge. The centrifuge includes a vertical shaft driven in rotation by a motor, and a mechanism for balancing the parts integral with said vertical shaft. The mechanism includes a plate integral with the vertical shaft, at least one compensating mass freely displacing on the plate, the mass being designed to limit the imbalance of parts integral with the vertical shaft, and a mechanism for blocking the compensating mass, the blocking mechanism being designed to immobilize the compensating mass on the plate when the rotation speed exceeds a determined value.

17 Claims, 5 Drawing Sheets

(51) Int. Cl.
*B04B 9/10* (2006.01)
*F16F 15/36* (2006.01)

(58) Field of Classification Search
USPC .................................... 369/263.1; 720/701
See application file for complete search history.

(56) References Cited

U.S. PATENT DOCUMENTS

| | | |
|---|---|---|
| 6,125,098 A | 9/2000 | Osawa |
| 8,262,551 B2 | 9/2012 | Akatsu et al. |
| 2005/0144736 A1* | 7/2005 | Jones .................. D06F 37/225 8/158 |
| 2008/0096750 A1* | 4/2008 | Hlavinka ............ A61M 1/3693 494/37 |
| 2010/0069216 A1 | 3/2010 | Ryu et al. |

* cited by examiner

CENTRIFUGE EQUIPPED WITH A BALANCING MECHANISM AND METHOD OF BALANCING SUCH A CENTRIFUGE

PRIORITY CLAIM

This application is a continuation of International Application No. PCT/EP2013/001105 filed Apr. 15, 2013, which claims priority to French Application Serial No. FR1253584 filed Apr. 18, 2012.

TECHNICAL FIELD

The invention relates to a centrifuge equipped with a balancing mechanism as well as a method of balancing such a centrifuge.

The domain of the invention is that of the design and production of centrifuge equipment. More specifically, the invention applies to centrifuges used in biological domains to centrifuge products in containers disposed in recesses provided in the rotor or carried by the rotor.

BACKGROUND

Conventionally, a centrifuge comprises:
a drive shaft;
a rotor intended to be removably mounted on the drive shaft in a mounting position in which the drive shaft and rotor are rotatably coupled;
a device for axially blocking the rotor on the drive shaft, comprising a male element carried by the rotor, resiliently biased and capable of occupying a cooperation position with an element presented by the drive shaft.

Such a centrifuge also comprises motor means intended to drive the drive shaft of the rotor in rotation, these motor means being connected to power supply means controlled by an operator-actuable command to launch a centrifugation cycle.

During the design, production and utilization of such a centrifuge, one of the parameters essential for the proper operation of a centrifuge, which must be carefully considered, relates to the balancing of rotating parts. In fact, centrifuges are machines capable of rotating at very high speeds (up to 150,000 rotations/min. for ultracentrifuges) and ensuring the proper balancing of the machine is indispensable for preventing the machine from producing, during operation, vibrations beyond a certain amplitude. In fact, these vibrations greatly disturb the centrifugation quality since they re-suspend products that were previously separated. In addition, these vibrations cause premature aging of the rotation system and suspension means. This aging may lead to breakage of parts and to an accident involving the operator.

Balancing consists of uniformly distributing the weight of the parts on the rotor, around the axis of revolution of the rotor. Currently, the balancing of parts to eliminate imbalances is done by hand. The operators, depending on their experience, quickly adjust the position of the parts to ensure optimal and safe centrifugation with varying degrees of success.

An additional difficulty resides in the fact that certain rotation speeds cause the rotation system to resonate and increases the vibrations applied to the products to be centrifuged. Experiments show that the resonance speed intervenes for a rotation speed well below the set speed, such that resonance intervenes both during acceleration and during braking Centrifuges are mainly used today to separate blood components. The separation takes, for example, 30 minutes and is carried out at a speed of 10,000 rotations per minute. If resonance generating significant vibrations intervenes during the braking phase, the blood components (platelets, white blood cells, red blood cells) will be mixed together again. A defect in the separation of components is catastrophic since this type of operation cannot be repeated and because of this, the blood bags must be discarded.

Document US 2010/0069216 A1 describes a method for controlling a centrifuge comprising a shaft coupled to a rotor, and a balancer that comprises an annular space in which a compensating material in the form of bead enables the samples to be centrifuged to be balanced. These beads freely displace in the annular space. The control comprises acceleration of the rotor beyond the resonance speed to achieve balancing, the measurement of vibrations, and the determination of the possibility or impossibility to accelerate and then decelerate below the resonance speed. However, this bead balancer presents the disadvantage that at the end of a centrifugation cycle, the beads will not necessarily return to their initial position, thus causing an additional imbalance.

Document EP 1 247 585 describes a balancing system for washing machines or medical-use centrifuges comprising two plates integral with a drive shaft, between which two rings surround said shaft. When stopped, a spring placed between one of the plates and a disk maintains the rings blocked. In operation, when the centrifugation speed reaches a certain value, oscillating bodies in contact with the disk pivot, thereby releasing the rings. When the centrifuge slows down, the rings are again blocked in their last position. However, the last ring position thus obtained corresponds to the centrifuge loading in progress. During a new loading, the blocking of rings in a particular position risks increasing the centrifuge imbalance, such that the balancing system will not eliminate the imbalance.

SUMMARY

The present invention guarantees the balancing of rotating parts during a centrifugation cycle in order to obtain the lowest possible level of vibrations throughout the cycle, including during acceleration and braking The centrifuge of the invention is composed of a mechanical system rebalancing the masses at the start of rotation. The mechanical system is advantageously associated with an electronic system controlling the level of vibrations and possibly stopping the operation of the centrifuge.

In material terms, the invention relates to a centrifuge comprising a vertical shaft driven in rotation by a motor, and a mechanism for balancing the parts integral with said vertical shaft, said mechanism comprising:
a plate integral with the vertical shaft,
at least one compensating mass freely displacing on said plate, said mass being designed to limit the imbalance of parts integral with the vertical shaft, and
a mechanism for blocking said compensating mass, said blocking mechanism being designed to immobilize said compensating mass on said plate when the rotation speed exceeds a determined value.

The determined speed is notably greater than the resonance speed of the centrifuge. Beyond the resonance speed, the compensating mass is positioned on the plate so as to compensate for a possible imbalance of parts integral with the shaft, for example due to improper loading of products to be centrifuged on or in the rotor. In this position of equilibrium, the compensating mass is blocked by the blocking mechanism. When the centrifuge is stopped, the compensating mass is again free to offset a new loading imbalance.

According to a particular embodiment, the balancing mechanism comprises a lower compensating mass and an upper compensating mass, each freely and respectively displacing on a base plate and on a separation plate integral with the vertical shaft. The separation plate slides vertically around the shaft. The utilization of two compensating masses is advantageous for not creating imbalances when there is no initial imbalance.

According to a particular embodiment, each compensating mass is in the form of a ring surrounding the vertical shaft. Below the determined speed, each ring is free to displace horizontally on its respective plate, in order to balance the parts integral with the drive shaft.

According to another embodiment, the blocking mechanism comprises a clamping plate placed over the upper compensating mass, said clamping plate may slide vertically around the vertical shaft. Lowering of the clamping plate will block the upper compensating mass on the separation plate that, in turn, will lower to block the lower compensating mass on the base plate.

In a particular embodiment, the blocking mechanism also comprises two balance weights integral with a holding plate by a pin enabling them to tilt in the direction opposite to the vertical shaft, said tilting of balance weights leading to the lowering of said clamping plate so as to immobilize the lower and upper compensating masses on their respective plates. In particular, the balance weights present, in section, an "L" shape. They are diametrically opposed with relation to the axis of revolution of the vertical shaft and their lower part is in contact with the clamping plate. Therefore, during rotation of the shaft, the centrifugal force will push the "L" forward, by pushing on the clamping plate so as to lower it.

Advantageously, a lower spring keeps the base plate and the separation plate apart so as to enable the free displacement of the lower compensating mass. When the centrifuge is stopped, the lower spring keeps the base plate and the separation plate apart to allow the compensating mass to freely displace. When the separation plate is lowered until the lower compensating mass is blocked, the lower spring is compressed. Then, during the braking phase, the lower spring expands.

Similarly, an upper spring keeps the separation plate and the clamping plate apart so as to enable the free displacement of the upper compensating mass. When the centrifuge is stopped, the upper spring keeps the clamping plate and the separation plate apart to allow the compensating mass to freely displace. When the clamping plate is lowered until the upper compensating mass is blocked on the separation plate, the upper spring is compressed. Then, during the braking phase, the upper spring expands.

In particular, the spring constant of the lower spring is greater than the spring constant of the upper spring. Therefore, the upper compensating mass is blocked before the lower compensating mass. This enables better balancing.

According to another particular embodiment, the centrifuge also comprises a rotor placed on said vertical shaft in a mounting position in which the drive shaft and the rotor are rotatably coupled.

In order to control the level of vibration in the centrifuge during a test cycle, the centrifuge also comprises a control module controlling the rotation speed of said shaft and receiving from a sensor signals on the level of vibrations measured within the centrifuge, said control module executing the following successive steps:

acceleration of rotation up to a determined speed N1 slower than the set speed;
deceleration of rotation to a determined speed N2;
measurement of the maximum level of vibrations during the acceleration and deceleration steps;
start of the full centrifugation cycle if the vibration level has not exceeded a certain threshold.

In particular, an acceleration value for reaching a set speed maintained during the centrifugation cycle is introduced on a keypad. The acceleration used during the acceleration step and/or deceleration step is equal to the value introduced. In this manner, it is possible to perform the test under the same acceleration conditions of the centrifugation cycle. According to a variation of embodiment, the slope of acceleration used during the acceleration and/or deceleration step is predefined for each centrifuge. In this manner, this slope is optimal for each centrifuge.

In a variation, several acceleration and deceleration steps are executed; the centrifugation cycle is started if, during an acceleration and deceleration step, the vibration level has not exceeded a certain threshold. In this manner, it is possible to attempt several tests where the mechanical parts may move and be better positioned before ending the centrifugation.

The centrifugation cycle is abandoned if the vibration level at the end of a determined number of acceleration and deceleration steps still exceeds a certain threshold. In this way, a maximum number of tests before ending the centrifugation may be defined. According to another embodiment, an indication is displayed to indicate that the centrifugation cycle is abandoned due to a too high level of vibrations. In this way, it is possible to notify the operator of the reason the centrifugation is abandoned.

According to another embodiment, the determined speed N1 and the determined speed N2 are calculated during a calibration step according to the detected resonance speeds. In this way, these parameters are adapted to each machine.

In functional terms, the invention relates to a method of balancing a centrifuge comprising a vertical shaft driven in rotation by a motor, said method comprising a step of blocking at least one compensating mass positioned on a plate integral with the shaft when the rotation speed exceeds a determined value, the at least one compensating mass being designed to limit the imbalance of parts integral with the vertical shaft. In this way, it is possible to limit the imbalance.

According to an embodiment, two independent compensating masses are each positioned on two horizontal plates coupled to the vertical shaft, the blockage is first done by immobilizing the first compensating mass from a first determined speed and by immobilizing the second compensating mass from another determined speed, the value of which is greater than the value of the first determined speed. In this way, the positioning of compensating masses enables better balancing of moving parts.

According to another embodiment, the blockage of compensating masses consists of lowering the plates above each of them while compressing two springs. The spring associated with the plate that blocks the first compensating mass before the second mass has a lower spring constant than the second spring. In this way, it is possible to ensure a successive blocking of two masses in a simple manner.

According to another embodiment, the balancing method comprises the steps of:
acceleration of rotation up to a determined first speed N1 slower than the set speed;
deceleration of rotation to a determined second speed N2;

measurement of the maximum level of vibrations during the acceleration and deceleration steps;

start of the full centrifugation cycle to reach the set speed if the vibration level has not exceeded a certain threshold.

In this way, the centrifugation cycle is only effectively launched if the vibration level remains acceptable during the test steps consisting of acceleration and deceleration.

BRIEF DESCRIPTION OF THE DRAWINGS

Other characteristics and advantages of the invention will appear more clearly upon reading the following description of a particular embodiment, given by way of a simple, non-limiting illustrative example, and of the attached drawings, among which.

DETAILED DESCRIPTION

For each centrifugation cycle, the present invention guarantees a minimum vibration level throughout the cycle by automatically offsetting the loading errors and rotating part imbalances, and particularly by controlling the vibration level to not exceed an admissible threshold.

Figure 1:
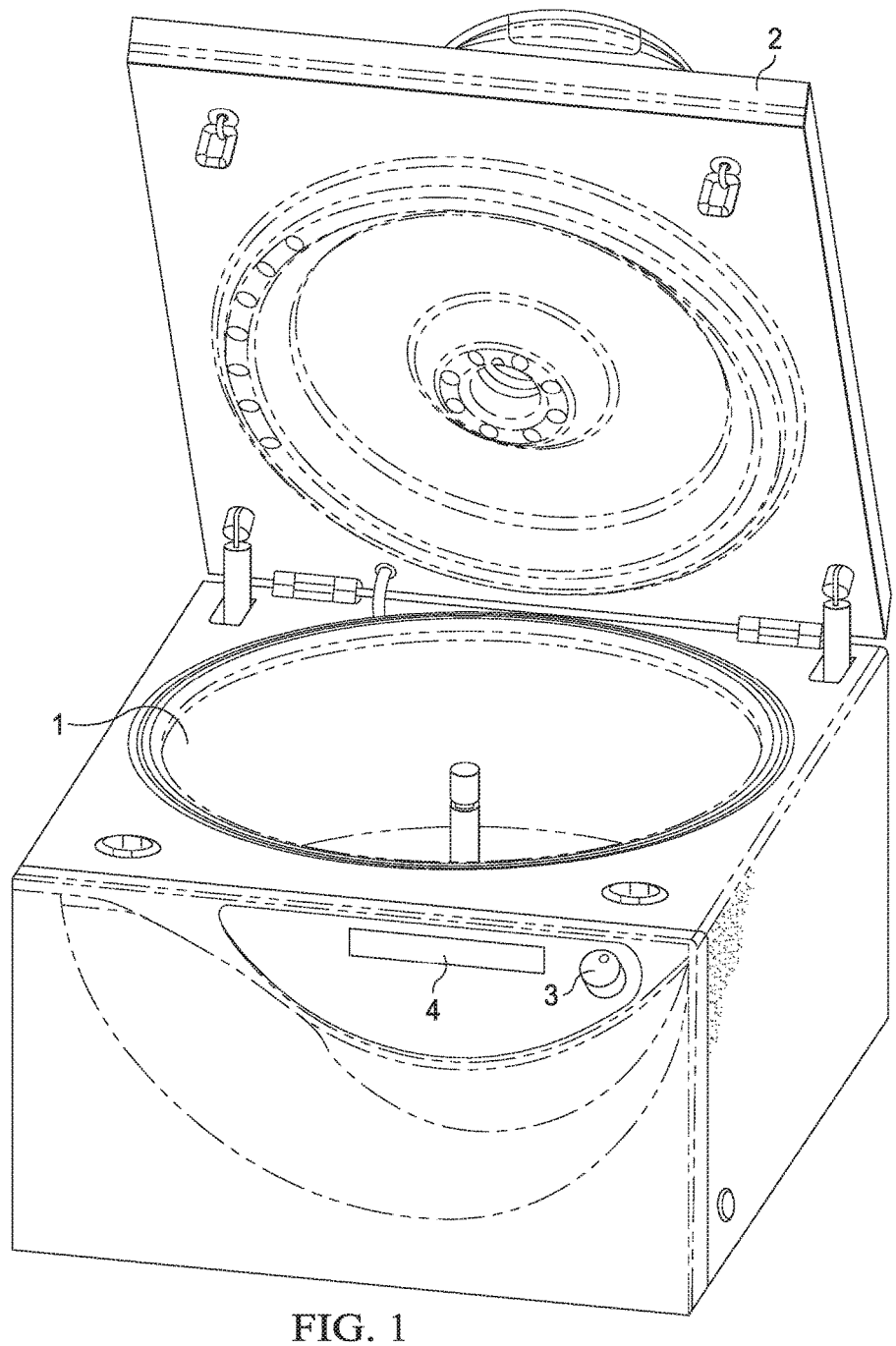
FIG. 1 is a schematic representation of a centrifuge according to an example of embodiment of the invention.

FIG. 1 presents a schematic diagram of a centrifuge according to a first example of embodiment of the invention. A centrifuge according to the invention comprises, in a manner conventional in itself, a tank 1 integrating:
- a motor unit connected to a vertical shaft;
- a rotor removably mounted on the drive shaft in a mounting position in which the drive shaft and rotor are rotatably coupled;
- a device ensuring axial blocking of the rotor on the drive shaft.

Tank 1 is closed by a lid 2 pivoting on a side of the body. A setting introduction means 3 is placed on a side of the apparatus, the means may be constituted of a potentiometer, a code wheel, pushbuttons to increment and decrement a value, or a touch screen, etc. A display means 4, typically an LCD or LED screen, is placed next to the setting introduction means 3 and enables the value of said setting, or other menu values, such as instantaneous speed, to be displayed. In the event of several values being displayed, another function of the introduction means 3 is to scroll the various menus that will be specified below.

Figure 2A:
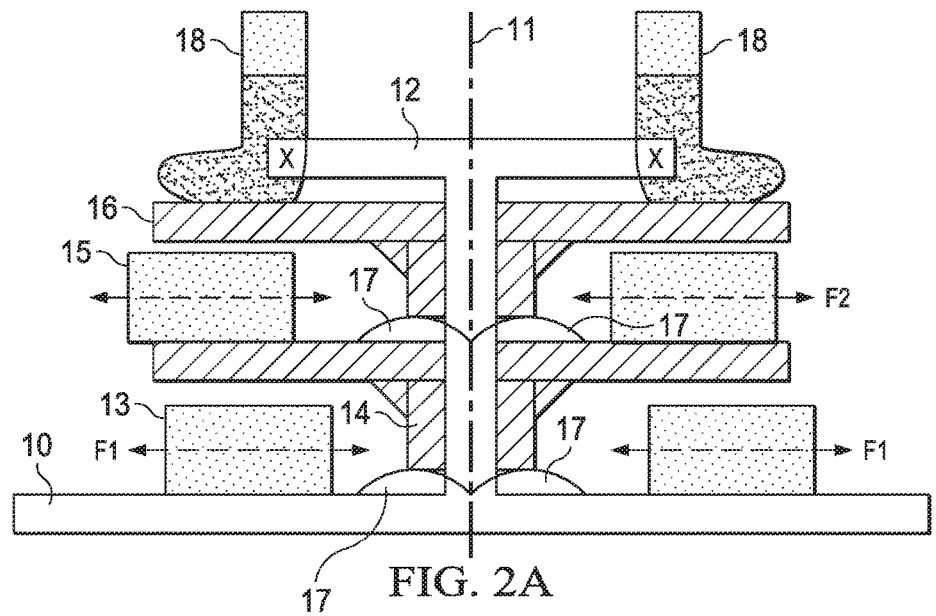
FIGS. 2A, 2B and 2C illustrate the mechanism for blocking compensating masses according to an example of embodiment at various rotation speeds.

FIG. 2A illustrates the position of parts composing the mechanism for blocking compensating masses when the motor is stopped, according to a particular example of embodiment.

A base plate 10 in stainless steel or aluminum is fixed in the upper part of a vertical shaft 11 coupled to a motor (not represented). The upper end of the vertical shaft 11 supports a plate 12 for holding balance weights. A ring-shaped lower compensating mass 13 surrounds the vertical shaft 11. The inner diameter of the ring is greater than the outer diameter of the shaft 11, so that the compensating mass 13 may slide horizontally on the base plate 10. A sliding plate (not represented) in polished stainless steel or in a material promoting sliding possibly covers the base plate to improve the displacement of the lower compensating mass 13. A separation plate 14 for separating compensating masses slides vertically around the vertical shaft 11 and covers the lower compensating mass 13. An upper compensating mass 15 surrounding the vertical shaft 11 may slide horizontally on the upper face of the separation plate 14. Similarly to the base plate, the separation plate 14 may be covered by a sliding plate (not represented). A clamping plate 16 is placed above the upper compensating mass 15. At least one spring 17 separates the upper face of the base plate 10 from the lower face of the separation plate 14. At least one other spring 17 also separates the upper face of the separation plate 14 and the lower face of the clamping plate 16. According to an example of embodiment, the springs 17 are wave washers, more commonly called BORRELLY™ washers (Borrelly Spring Washers, France). In this position, compensating masses 13 and 15 are free to displace horizontally in the directions indicated by arrows F1 and F2. At least two balance weights 18, the section of which is in an "L" shape, are disposed above in positions that are diametrically opposed with relation to the axis of revolution. These balance weights are integral with the holding plate 12 by a pin enabling them to tilt in the direction opposite to the vertical shaft 11.

Figure 2B:
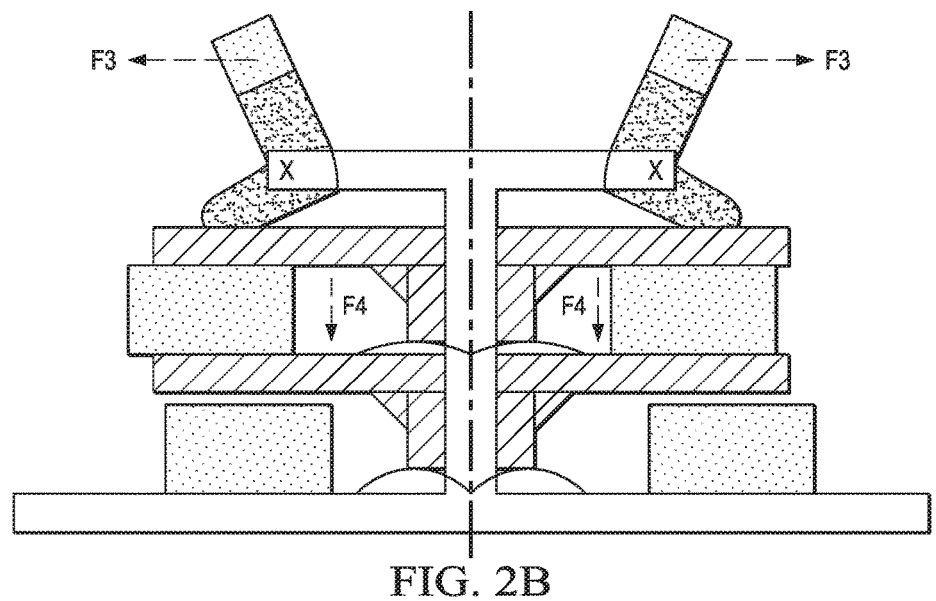

When the vertical shaft 11 is not rotating, compensating 13 and 15 masses displace freely on their respective plates. FIG. 2B presents the mechanism for blocking compensating masses when the rotation speed of the vertical shaft 11 is slow. The two balance weights 18 comprise masses in the upper part, represented by cross-hatching in FIG. 2B. In rotation, the centrifugal force is mainly exerted on these masses, thereby forcing the balance weights 18 to tilt in the direction opposite to the vertical shaft 11 (arrow F3 from FIG. 2B). Tilting of the upper part of the balance weight leads to a lowering (arrow F4 from FIG. 2B) of the end of the lower part in contact with the clamping plate 16. Lowering of the clamping plate 16 causes the springs 17 to compress. Advantageously, the spring constant of springs placed on the base plate 10 and on the separation plate 14 are not equal. According to an example of embodiment, springs 17 placed on base plate 10 have a constant greater than that of springs placed on separation plate 14. In this way, the springs placed on separation plate 14 are deformed first and the upper compensating mass 15 is blocked before the lower compensating mass 13. FIG. 2B shows the blockage of the upper compensating mass only, when the rotation speed is within an interval of determined values.

Figure 2C:
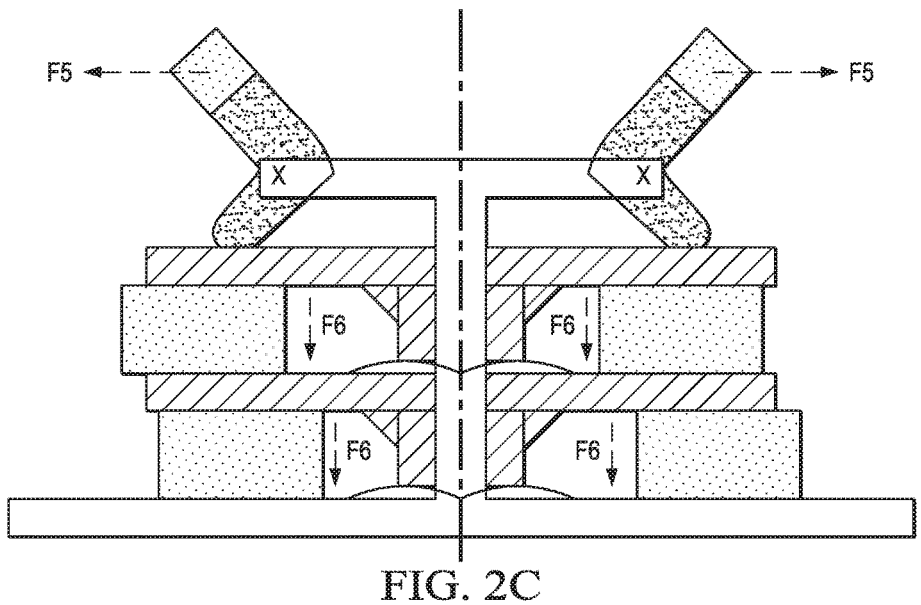

FIG. 2C presents the mechanism for blocking compensating masses when the rotation speed of the vertical shaft 11 becomes faster. In rotation, the centrifugal force forces the balance weights 18 to tilt in the direction opposite to the vertical shaft 11 (arrow F5 from FIG. 2B). Tilting of the upper part of the balance weight leads to lowering (arrow F6 from FIG. 2C) of the end of the lower part in contact with clamping plate 16. The force exerted on the clamping plate is sufficient to compress the two springs 17, thereby blocking the lower compensating mass 13. Blocking of the two compensating masses intervenes from a given rotation speed determined according to the geometry and distribution of balance weight 18 masses. The successive blockage of the two compensating masses prevents them from offsetting each other without offsetting the imbalance of all of the rotating parts.

In particular, the present invention prevents too high vibrations from altering the quality of products issued from centrifugation. Therefore, the vibrations occurring during a centrifugation cycle should be analyzed, and the cycle should possibly not be launched.

To analyze the vibrations due to an imbalance, a detector is placed on the bodywork of the centrifuge. This detector measures the amplitude of displacements at least on the horizontal plane. These displacements, due to the imbalance of rotating parts, generate a sinusoidal motion around a rest position, in the horizontal x and y directions, and to a lesser extent, in the vertical z direction. These movements cause vibrations that are detrimental to the quality of the centrifugation and to the longevity of the equipment. The value provided by the detector is proportional to the amplitude of the vibrations.

Other blocking mechanisms intervening from a certain speed may be considered within the context of the present invention. For example, one may consider magnets stuck to the compensating masses, immobilizing them from a certain speed.

Figure 3:
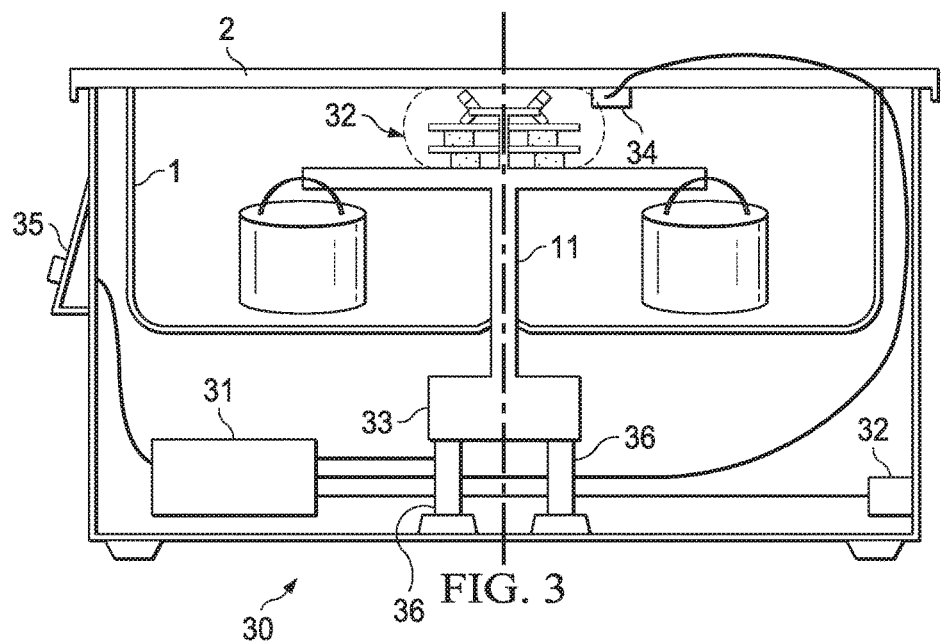
FIG. 3 shows an example of a block diagram for a centrifuge with an electronic control unit.

FIG. 3 shows an example of a block diagram of a centrifuge 30 with an electronic control unit 31 connected to a vibration detector 37. Tank 1 is topped by a lid 2 to prevent any projections. The vertical shaft 11 traverses the bottom of tank 1, a seal ensures that it is leakproof. Cups are disposed symmetrically around the vertical shaft 11 and receive the products to be centrifuged.

The vertical shaft 11 topped by its balancing mechanism 32 illustrated in FIGS. 2A, 2B and 2C is mechanically coupled to the drive motor 33. The control module 31 composed of an electronic card sends commands to the motor 33 in the form of electronic control and power signals. The module 31 also receives signals from a tachometric probe 34 for controlling the rotation speed of the vertical shaft 11. According to a particular example of embodiment, the tachometric probe 34 is a magnetic sensor placed in lid 2; this probe detects the passage of a metal part driven in rotation by the vertical shaft 11. The control module 31 is also connected to a vibration detector 37 responsible for detecting vibrations from the apparatus. According to an example of embodiment, this detector is an accelerometer capable of analyzing movements in the three x, y and z dimensions. Detector 37 sends 16-bit data sampled at the 2 KHz frequency.

The control module 31 is also connected to a user interface 35 comprising means for introducing commands (push-button, potentiometer, code wheel, touch screen, etc.) and display means (visual indicator, LCD screen, 7-segment display, etc.). The control module is then connected to a power supply module (not represented).

A shock absorbing system 36 immobilizes the motor within the centrifuge 30. This shock absorbing system is constituted for example of SILENTBLOC® (Paulstra Vibrachoc, Belgium), SILENTBLOC® is a part constituted of a flexible material that absorbs shocks and vibrations between mechanical parts and their supporting structure. The assembly formed by the compensating masses and by the shock absorbing system decreases the vibrations of the apparatus. The present invention solves the case where the imbalance is greater than that which may be offset by the vibration reducer assembly, in which two cases may be produced:

The residual vibrations cannot be offset by suspension of the centrifuge. The cycle must be stopped during the acceleration phase so that the vibrations affect the apparatus and products to be centrifuged for the shortest possible time.

The residual vibrations are offset by suspension of the centrifuge before the compensating masses are positioned. The cycle is continued but high-amplitude vibrations will be felt at the end of deceleration, causing the products to be mixed.

In particular, the present invention eliminates the ability to launch centrifugation in the presence of the two cases described above.

Figure 4:
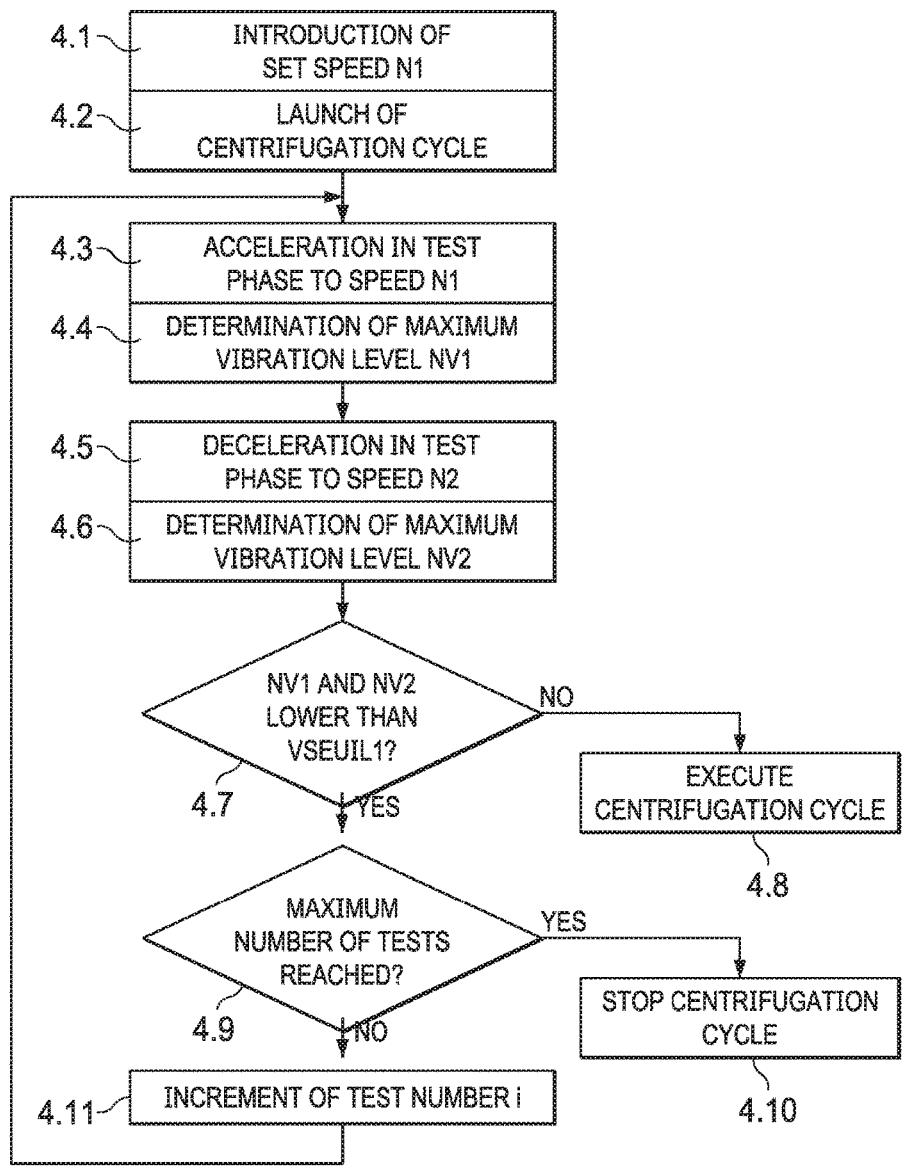
FIG. 4 presents an example of a flow chart presenting the steps for carrying out a centrifugation cycle by guaranteeing a minimum level of vibrations.

FIG. 4 presents a flow chart of steps for completing a centrifugation cycle by guaranteeing a minimum level of vibrations throughout the cycle, including during deceleration. The flow of steps thus described relies on a mechanical system operating a rebalancing of masses at the start of rotation, associated with an electronic system controlling the level of vibrations.

First of all, the operator turns the centrifuge 30 on and introduces a set speed via the user interface 35 (step 4.1). In step 4.2, the operator orders the centrifugation cycle. The control module 34 launches the motor 33 in an acceleration phase up to a first test speed N1 (step 4.3). This speed N1 is chosen to be higher than the resonance speed of the machine. The imbalance and the type of loading may cause the resonance speed to vary to a certain extent, such that the value N1 is chosen to be higher than the resonance speed in all cases. According to a first example of embodiment, the centrifuge has a calibration module that can be executed at the factory by the control module 31. The centrifuge may be calibrated before it is sold. The calibration step consists of first performing several no-load acceleration and deceleration cycles and then cycles with a maximum load (specified by the characteristics of the machine). The control module determines the speeds during which a maximum level of vibrations is detected, and calculates N1 to be higher by a certain percentage than the highest determined speed. In addition, a second test speed N2 is calculated to be lower by a certain percentage than the slowest determined speed and lower than the speed at which the compensating masses are blocked. Speed N2 is possibly zero. Speeds N1 and N2 are calculated to control the resonance speed, regardless of the imbalance and load type.

The speed of the motor is controlled by a servo system integrated with the control module 31 comprising the tachometric probe 34. During this acceleration phase, the control module 31 receives signals from the vibration detector 37 and analyses the signals to determine the maximum value. In step 4.4, the control module determines the maximum level NV1 of vibrations, this level is expressed in meters per second squared. In step 4.5, the control module triggers a deceleration phase down to a speed N2. In step 4.6, the control module determines the maximum level NV2 of vibrations during the test phase deceleration.

In step 4.7, the control module 34 compares the values NV1 and NV2 with a threshold value Vseuil1 determined by experimentation as being the maximum amplitude value of vibrations allowed on this type of centrifuge. If the vibration amplitude remains below the threshold value, the centrifugation cycle may be fully executed (step 4.8). In this favorable event, the effect of centrifugation on the products will be effective and the centrifuge will not be subject to excessive vibrations. If in step 4.7, it is verified that the amplitude of vibrations is greater than the admissible threshold, then a new test is attempted. Indeed, during this new test, it is possible that the compensating masses are positioned differently and thereby improve the balance of the rotating parts. In step 4.9, the number of tests is compared to a maximum number of tests, which is, for example, 3. If the maximum number of tests is reached, then the module decides to stop the centrifugation cycle and an indication is displayed for the operator via the user interface 35 (step 4.10). If not, the number of current tests is incremented (step 4.11) and the module restarts an acceleration phase (step 4.3).

If the centrifugation cycle is not triggered due to a significant imbalance, the operator may carry out a new centrifuge adjustment by moving the products subject to centrifugation and launching a new test.

Figure 5:
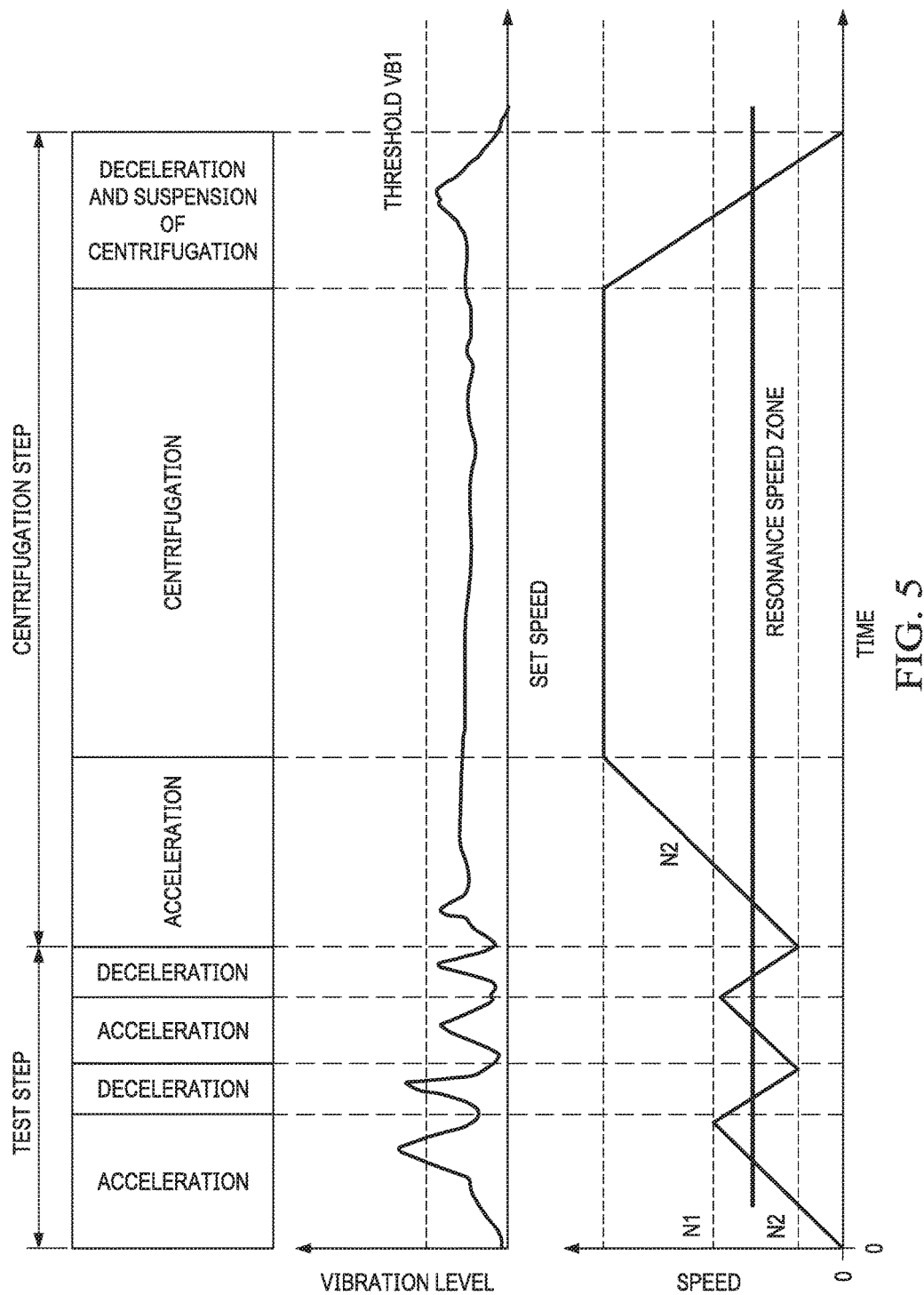
FIG. 5 presents an example of a time chart for various phases composing a centrifugation cycle by indicating the rotation speed and the minimum level of vibrations.

FIG. 5 presents a time chart for various phases composing a centrifugation cycle by indicating the rotation speed of the vertical axis 11 and the level of vibrations measured by the vibration detector 37.

Firstly, the operator introduces the centrifugation parameters via the user interface 35 and launches the cycle. The control module 31 triggers the test step and accelerates the speed up to value N1. Near the resonance speed zone, the vibration amplitude increases and then falls. When speed N1 is reached, the control module triggers deceleration. When the speed enters the resonance speed zone, the vibrations increase in the same way as before. First, we assume that the vibration amplitude exceeds the admissible threshold, then the control module decides to proceed to a new test. The speed of the vertical shaft again increases up to value N1. During this acceleration step, the compensating masses are blocked in another position that enables all of the rotating parts to be better balanced, and then the speed falls to value N2. During this second test, the vibration amplitude does not exceed Vseuil1. The control module then decides to launch a full centrifugation cycle.

In the example illustrated in FIG. 5, it may be observed that the vibration level did not exceed the maximum admissible threshold Vb 1 and therefore, the products had the effect obtained by centrifugation. At the end of the allocated centrifugation time, the control module triggers braking and suspension of rotation of the vertical axis 11.

According to a particular embodiment, the operator may introduce an acceleration value to reach the set speed. According to a simple example, the acceleration is constant and is expressed by a simple numerical value. Other cases are possible, such as progressive acceleration according to a linear function of time, or an exponential function. According to an example of embodiment, the slope of acceleration used during the test step may be equal to the slope used to launch the centrifugation cycle. Furthermore, if the operator introduces a deceleration value, this slope may be used to set the deceleration step during the test step before launching centrifugation.

According to a particular embodiment, the user interface 35 displays the maximum level of vibrations measured during an acceleration phase and an indication that this level is greater than the admissible level. In this way, the operator may observe if the overrun is minimal and therefore if he can adjust the device differently to offset the imbalance or if the overrun is too high to be offset. By adjusting the parts differently and by controlling the effects on vibration amplitude via interface 35, the operator may gain experience in operating centrifuges more quickly. Advantageously, the user interface also displays the speed at which the maximum vibration amplitude is reached; typically this is the resonance speed. This parameter also helps the operator to position the parts and products subject to centrifugation.

According to a particular embodiment, the user interface has a menu, buttons or potentiometer that is possibly hidden or at least difficult to access to adjust the admissible value of the vibration level Threshold Vb1.

According to a particular embodiment, the user interface has buttons or a potentiometer that is possibly hidden or at least difficult to access to introduce the maximum number of tests launched by the control module before abandoning the centrifugation phase.

The invention claimed is:

1. A centrifuge comprising:
   a vertical shaft comprising parts integral with the vertical shaft, the vertical shaft driven in rotation by a motor;
   a control module comprising a tachometric probe for controlling a rotation speed of the vertical shaft; and
   a mechanism for balancing the parts integral with the vertical shaft, the mechanism comprising:
   a base plate integral with the vertical shaft,
   a separation plate integral with the vertical shaft,
   at least a lower compensating mass and an upper compensating mass, both freely displacing on the base plate and the separation plate, respectively, when the rotation speed of the vertical shaft is below a determined value, the lower and upper compensating masses being designed to limit any imbalance of the parts integral with the vertical shaft; and
   a mechanism for blocking the compensating mass by immobilizing the lower and upper compensating masses on the base plate and the separation plate respectively when the rotation speed of the vertical shaft exceeds a determined value.

2. The centrifuge according to claim 1, wherein both compensating masses are in the shape of a ring surrounding the vertical shaft.

3. The centrifuge according to claim 1, wherein the mechanism for blocking the compensating mass comprises a clamping plate placed over the upper compensating mass, and wherein the clamping plate slides vertically around the vertical shaft.

4. The centrifuge according to claim 3, wherein the blocking mechanism further comprises two balance weights made integral with a holding plate by a pin enabling the two balance weights to tilt in a direction opposite to the vertical shaft, wherein tilting of the two balance weights leads to lowering of the clamping plate to immobilize the lower compensating mass and the upper compensating mass on their respective plates.

5. The centrifuge according to claim 4, wherein the balance weights both have an "L" shape cross-section.

6. The centrifuge according to claim 4, wherein the balance weights are diametrically opposed in relation to an axis of revolution of the vertical shaft.

7. The centrifuge according to claim 4, wherein a lower part of both balance weights contacts the clamping plate.

8. The centrifuge according to claim 1, wherein a lower spring separates the base plate and the separation plate, allowing free displacement of the lower compensating mass.

9. The centrifuge according to claim 3, wherein an upper spring separates the separation plate and the clamping plate, allowing free displacement of the upper compensating mass.

10. The centrifuge according to claim 3, wherein a lower spring separates the base plate and the separation plate, allowing free displacement of the lower compensating mass, wherein an upper spring separates the separation plate and the clamping plate, allowing free displacement of the upper compensating mass, and wherein a spring constant of the lower spring is greater than a spring constant of the upper spring.

11. The centrifuge according to claim 1, further comprising a rotor mounted on and rotatably coupled to the vertical shaft.

12. The centrifuge according to claim 1, further comprising a sensor for measuring vibrations within the centrifuge and a control module for controlling the rotation speed of the vertical shaft in response to vibrations measured by the sensor.

13. A method of balancing a centrifuge comprising:
driving a vertical shaft of the centrifuge in rotation by a motor at a rotation speed;
controlling the rotation speed of the vertical shaft by a control module comprising a tachometric probe;
blocking at least a first compensating mass positioned on a first horizontal plate integral with the vertical shaft when the rotation speed of the vertical shaft exceeds a determined value;
blocking a second compensating mass positioned on a second horizontal plate at a second determined speed, wherein the second determined speed is greater in value than the first determined speed; and
limiting an imbalance of parts integral with the vertical shaft using the at least one compensating mass.

14. The method according to claim 13, wherein blocking further comprises lowering the second horizontal plates and a third horizontal plate above the first and second compensating masses, respectively, while compressing a first spring and a second spring, wherein the first spring is associated with the first horizontal plate and first compensating mass and the second spring is associated with the second horizontal plate and second compensating mass, and wherein the first spring has a lower spring constant than the second spring.

15. The method according to claim 13, further comprising:
accelerating the rotation to a first determined speed slower than determined value;
decelerating the rotation to a second determined speed;
measuring a maximum level of vibrations during the acceleration and deceleration; and
commencing driving if the maximum level of vibrations did not exceed a threshold level.

16. A centrifuge system, the system comprising:
a centrifuge comprising:
a vertical shaft comprising parts integral with the vertical shaft, the vertical shaft driven in rotation by a motor;
a control module comprising a tachometric probe for controlling a rotation speed of the vertical shaft; and
a mechanism for balancing the parts integral with the vertical shaft, the mechanism comprising:
a first horizontal plate integral with the vertical shaft and associated with a first spring,
a second horizontal plate associated with a second spring, wherein the first spring has a lower spring constant than the second spring;
at least a first compensating mass freely displacing on the first horizontal plate and a second compensating mass freely displacing on the second horizontal plate, the first and second compensating masses being designed to limit any imbalance of the parts integral with the vertical shaft; and
a mechanism for blocking the compensating mass by immobilizing the compensating mass on the first horizontal plate when the rotation speed of the vertical shaft exceeds a determined value,
the centrifuge operable to be balanced by:
driving the vertical shaft in rotation by a motor at a rotation speed;
blocking the first compensating mass at a first determined speed by lowering the second horizontal plate while compressing the first spring; and
blocking the second compensating mass at a second determined speed by lowering a third horizontal plate while compressing the second spring, wherein the second determined speed is greater in value than the first determined speed; and
limiting an imbalance of parts integral with the vertical shaft using the at least first and second compensating masses.

17. The system of claim 16, wherein the centrifuge further comprises a sensor and a control module operable to control the centrifuge by:
accelerating the rotation to a first determined speed slower than determined value;
decelerating the rotation to a second determined speed;
measuring a maximum level of vibrations during the acceleration and deceleration using the sensor; and
commencing driving using the control mechanism if the maximum level of vibrations did not exceed a threshold level.

* * * * *